US008639275B1

(12) United States Patent
Zang et al.

(10) Patent No.: US 8,639,275 B1
(45) Date of Patent: *Jan. 28, 2014

(54) METHOD FOR INCREASING THE NUMBER OF CONCURRENT PAGE RECORDS SENT TO MOBILE STATIONS

(71) Applicant: Sprint Spectrum L.P., Overland Park, KS (US)

(72) Inventors: Hui Zang, Cupertino, CA (US); Liang Cai, San Diego, CA (US); Hao Chen, Kensington, CA (US); Gabriel Maganis, Davis, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/870,406

(22) Filed: Apr. 25, 2013

Related U.S. Application Data

(62) Division of application No. 12/564,213, filed on Sep. 22, 2009, now Pat. No. 8,509,821.

(60) Provisional application No. 61/241,701, filed on Sep. 11, 2009.

(51) Int. Cl.
*H04W 68/00* (2009.01)

(52) U.S. Cl.
USPC ..... 455/458; 455/410; 455/426.2; 455/404.1; 455/404; 455/452.1; 455/517; 370/312; 370/336; 370/230; 370/311; 370/328; 370/329; 370/330; 370/235

(58) Field of Classification Search
USPC ........ 455/458, 410, 426.2, 404.1, 411, 452.1, 455/517; 370/312, 336, 230, 311, 328, 329, 370/330, 235
See application file for complete search history.

(56) References Cited

U.S. PATENT DOCUMENTS

| 6,339,588 B1 | 1/2002 | Katsuragawa |
| 7,289,469 B2 | 10/2007 | Alapuranen |

(Continued)

FOREIGN PATENT DOCUMENTS

| EP | 1463368 A2 | 9/2004 |
| WO | WO2006093379 A1 | 9/2006 |

OTHER PUBLICATIONS

Pars Mutaf and Claude Castelluccia. "Hash-Based Paging and Location Update Using Bloom Filters", a paging algorithm that is best suitable for ipv6. Mob. Netw. Appl, 9(6): 627-631, 2004.

(Continued)

*Primary Examiner* — Joseph Arevalo

(57) ABSTRACT

Disclosed herein is a method that enables a radio access network (RAN) to page more mobile stations concurrently. By reducing the size of the individual page record, more page records can fit within a general page message (GPM), and thus more mobile stations can receive page messages. One method of reducing the size of an individual page record is to reduce the size of the terminal IDs that page records carry. Currently, terminal IDs are globally unique, but they can be shortened if replaced with locally unique IDs. These locally unique IDs are unique for only mobile stations in a given paging area, unique for only mobile stations assigned to a given paging channel time slot, and/or unique for only mobile stations in a subgroup of mobile stations assigned to a given paging channel time slot. The number of mobile stations in any of these groups is smaller than the number of mobile stations in the global network. Therefore, the length of a terminal ID that is unique for only mobile stations in one of these groups can be shorter than a globally unique identifier.

8 Claims, 6 Drawing Sheets

(56) References Cited

U.S. PATENT DOCUMENTS

| | | | |
|---|---|---|---|
| 7,386,320 B2 | 6/2008 | Laroia | |
| 8,064,932 B2 | 11/2011 | Tsai | |
| 8,219,118 B2 | 7/2012 | Kim | |
| 8,305,894 B1 | 11/2012 | Zang | |
| 2006/0046762 A1 | 3/2006 | Yoon | |
| 2009/0303953 A1 | 12/2009 | Kang | |
| 2010/0062795 A1 | 3/2010 | Lee | |

OTHER PUBLICATIONS

Hui Zang and Jean C. Bolot. "Mining Call and Mobility Data to Improve Paging Efficency in Cellular Networks". In MobiCom '07: Proceedings of the 13th annual ACM international conference on Mobile computing and networking, pp. 123-134, New York, NY, USA, 2007. ACM.

A.T. Campbell, J. Gomez, and A.G. Valko. "An overview of cellular IP". Wireless Communications and Networking Conference, 1999. WCNC. 1999 IEEE, pp. 606-610 vol. 2, 1999.

Jeremy Serror, Hui Zang, and Jean C. Bolot. "Impact of Paging Channel Overloads or Attacks on a Cellular Network", In WiSe'06: Proceedings of the 5th ACM workshop on Wireless security, pp. 75-84, New York, NY, USA, 2006. ACM.

Markku Verkama, "A Simple Implementation of Distance-Based Location Updates",. Nokia Telecommunications, IEEE 1997, pp. 163-167.

R. Ramjee, K. Varadhan, L. Salgarelli, S.R. Thuel, Shie-Yuan Wang, and T. LaPorta. "Hawaii: A Domain-Based Approach for Supporting Mobility in Wide-Area Wireless Networks", Networking, IEEE/ACM Transactions on, 10((3): 396-410, Jun. 2002.

C.U. Saraydar et al., "Minimizing the Paging Channel Bandwidth for Cellular Traffic". Wireless Information Networks LABoratory (WINLAB), Dept. of Electrical & Computer Engineering.

S. Mohanty, M. Venkatachalam, and X. Yang. "A Novel Algorithm for Efficient Paging in Mobile WiMAX". Mobile WiMAX Symposium, 200. IEEE, pp. 48-53, Mar. 2007.

Hyun Suk Roh and Sang Ho Lee. "Paging Scheme for High-speed Portable Internet (HPi) System". Advanced Communication Technology, 2006. ICACT 2006. The 8th International Conference, 3:4 pp.-1732, Feb. 2006.

Sandip Sarkar, Brian K. Butler, and Edward G. Tiedemann, Jr. "Phone Standby Time in cdma2000: The Quick Paging Channel in Soft Handoff". IEEE Transactions on Vehicular Technology, vol. 50, No. 5, Sep. 2001.

Xiaowei Zhang, Javier Gomez Castellanos and Andrew T. Campbell. "P-MIP: Paging Extensions for Mobile IP". Mobile Networks and Applications 7(2), pp. 127-141, 2002.

Dr. Jey Veerasamy, John Jubin and Sanjay Kodali. "Practical Approach to Optimize Paging Success Rate in CDMA Network". IEEE Communications Society/WCNC 2005, pp. 1353-1358.

Markku Verkama. "A Simple Implementation of Distance-Based Location Updates". IEEE Explore, Jan. 18, 2009, pp. 163-167.

William Enck, Patrick Traynor, Patrick McDaniel and Thomas LaPorta. "Exploiting Open Functionality in SMS-Capable Cellular Networks". In CCS '05: Proceedings of the 12th ACM conference on Computer and communications security, pp. 393-404, New York, NY, USA, 2005. ACM.

Sandip Sakar, Brian Butler and Edward Tiedemann. "Soft Handoff on the Quick Paging Channel". Global Telecommunications Conference—Globecom'99. pp. 2794-2798.

Direct Spread Specification for Spread Spectrum Systems on ANSI-41 (DS-41) (Upper Layers Air Interface), Jun. 9, 2000. 3GPP2 C.S0007-0.

Behcet Sarikaya, Phil Barber, Muthu Venkatachalam and Benjamin Koh. "Multi-Radio Paging Study Group Request". IEEE 802.21 media Independent Handover.

Multi-carrier Specification for Spread Spectrum Systems on GSM MAP (MC=MAP) (Lower Layers Air Interface). Jun. 9, 2000. 3GPP2 C.S0008-0.

Havish Koorapaty and Per Ernstrom. Quick paging signal for IEEE 802.16e, May 2008.

Shantidev Mohanty, Muthaiah Venkatachalam, Shailender Timiri and Sassan Ahmadi. Proposal for IEEE 802.16m Quick Paging Channel Design, Jul. 10, 2008.

Matt Dillon and Matt Burns. "Method of Increasing Paging Channel Capacity with Respect to Paging Success Probabilities by Reducing Unnecessary Paging Attempts". 2007 Motorola, Inc.

Introduction to CDMA2000 Standards for Spread Spectrum Systems. Release D. Sep. 6, 2005. 3GPP2 C. S0001-D.

Physical Layer Standard for CDMA2000 Spread Spectrum Systems. Revision D. Sep. 2005. 3GPP2 C. S0002-D.

"Medium Access Control (MAC) Standard for CDMA2000 Spread Spectrum Systems". Release D. Sep. 2005. 3GPP2 C.S0003-D.

Signaling Link Access Control (LAC) Standard for CDMA2000 Spread Spectrum Systems. Revision Dv2.0. Sep. 2005. 3GPP2 C.S0004-D.

"Upper Layer (Layer 3) Signaling Standard for CDMA2000 Spread Spectrum Systems". Release D. Sep. 6, 2005. 3GPP2 C.S0005-D.

"Air Interface for Fixed and Mobile Broadband Wireless Access Systems". Feb. 2006. IEEE Std 802.16eTM-2005.

H. Haverinen, J. Malinen. Mobile IP Regional Paging, Jun. 2000. draft-haverinen-mobileip-reg-paging-00.txt.

C. Perkins. IP Mobility Support. Oct. 1996. S_RFC2002.txt.

J. Kempf. Dormant Mode Host Alerting ("IP Paging") Problem Statement, Jun. 2001. rfc3132.

D. Johnson, C. Perkins, J. Arkko. Mobility Support in IPv6, Jun. 2004. rfc3775.

Patrick Traynor, Patrick McDaniel and Thomas La Porta. On Attack Causality in Internet-Connected Cellular Networks. In Proceedings of 16th USENIX Security Symposium on USENIX Security Symposium, 2007.

Pierre Reinbold and Olivier Bonaventure. Infonet: A Comparison of IP Mobility Protocols. Technical Report infonet-TR-13, Dec. 2001.

I.F. Akyildiz and S.M. Ho. On Location Management for Personal Communications Networks. Communications Magazine, IEEE, 34(9): 138-145, Sep. 1996.

Liang Cai, Gabriel Maganis, Hui Zang, and Hao Chen, Mitigating DoS Attacks on the Paging Channel by Efficient Encoding in Page Messages, (available Sep. 7, 2009 at http://www.cs.ucdavis.edu/~hchen/paper/.

| Field | value | length(bit) |
|---|---|---|
| General Paging Message | | |
| *Message Header* | | |
| MSG_LENGTH | 0000xxxx | 8 |
| MSG_ID | 010001 | 6 |
| CONFIG_MSG_SEQ | 000011 | 6 |
| ACC_MSG_SEQ | 011101 | 6 |
| CLASS_0_DONE | 1 | 1 |
| CLASS_1_DONE | 1 | 1 |
| TMSI_DONE | 0 | 1 |
| ORDERED_TMSIS | 1 | 1 |
| BROADCAST_DONE | 1 | 1 |
| RESERVED | 0000 | 4 |
| ADD_LENGTH | 000 | 3 |
| *Mobile Station 1* | | |
| PAGE_CLASS | 00 | 2 |
| PAGE_SUBCLASS | 00 | 2 |
| MSG_SEQ | 100 | 3 |
| IMSI_S | (xxx) xxx-xxxx | 34 |
| SDU_INCLUDED | 1 | 1 |
| SERVICE_OPTION | xx | 16 |
| *Mobile Station 2* | | |
| ... | | |
| *Message end Padding* | | |
| PDU_PADDING | 0000 | 4 |
| CRC | | 30 |

FIG. 4

METHOD FOR INCREASING THE NUMBER OF CONCURRENT PAGE RECORDS SENT TO MOBILE STATIONS

REFERENCE TO RELATED APPLICATION

The present application is a divisional of U.S. patent application Ser. No. 12/564,213, titled "Method for Increasing the Number of Concurrent Page Records Sent to Mobile Stations," filed on Sep. 22, 2009, which claims priority to U.S. Provisional Patent Application No. 61/241,701, filed on Sep. 11, 2009, the entirety of each is hereby incorporated by reference.

BACKGROUND

In a typical wireless communication network, an area is divided geographically into a number of cells and cell sectors, each defined by a radio frequency (RF) radiation pattern from a respective base transceiver station (BTS). Within each cell sector, the BTS's RF radiation pattern provides an air interface through which mobile stations (or terminals) may communicate with the BTS. The BTSs in the cells in turn couple to a base station controller (BSC), which then couples to a telecommunications switch or gateway, such as a mobile switching center (MSC) or packet data serving node (PDSN) for instance. The switch or gateway may then couple to a transport network, such as a public switched telephone network (PSTN) or a packet-switched network (e.g., the Internet). Conveniently with this arrangement, when a mobile station is positioned within a given cell sector, the mobile station can communicate with entities on the transport network via a communication path comprising the RF air interface, the BTS, the BSC, the switch or gateway, and the transport network. The combination of network entities that provides a connection between the mobile station and the transport network may be considered a radio access network (RAN).

The RF air interface of any given cell sector is typically divided into a plurality of channels for carrying communications between the mobile stations and the BTS. For example, the RF air interface may include (i) a plurality of forward-link channels (e.g., pilot channels, sync channels, paging channels, and forward-traffic channels) for carrying communications from the BTS to the mobile stations, and (ii) a plurality of reverse-link channels (e.g., access channels and reverse-traffic channels) for carrying communications from the mobile stations to the BTS.

A paging channel of the RF air interface is typically used for signaling mobile stations, setting up communications with mobile stations, and delivering small messages to mobile stations. Mobile stations that are in dormant mode (i.e. not assigned a traffic channel) monitor the paging channel periodically instead of continuously in order to reduce power consumption.

In a Code Division Multiple Access (CDMA) wireless communication network, the paging channel is typically divided into a number of time slots (e.g., 32 or 64 slots) of a specific duration (e.g., 80 ms). The group of time slots is defined as a slot cycle, and the slot cycle repeats continuously. For example, a paging channel with 32 slots, each 80 ms in duration, will have a slot cycle of 2.56 seconds. Therefore, each individual slot repeats every 2.56 seconds.

Several sectors may define a paging area, and when a mobile station registers with the network in a given paging area, the RAN assigns the mobile station to one of the time slots (generally distributing the mobile stations evenly among all of the time slots). Mobile stations assigned to the same time slot constitute a slot group. When the RAN has a page message to send to a particular mobile station, it sends the page during the mobile station's assigned time slot. To receive pages from the RAN, a mobile station only needs to wake up only during its assigned slot in order to listen for the page; it can remain asleep for the rest of the slot cycle. In the above example, a mobile station wakes up for 80 milliseconds every 2.56 seconds to listen for pages on the paging channel. This saves a considerable amount of battery life compared to continuously monitoring the paging channel.

Rather than sending separate page messages to each mobile station, the RAN may broadcast a General Page Message (GPM) to all mobile stations in a particular slot group. The GPM includes one or more individual page messages or records. Each page record identifies a particular mobile station and contains a page message for that particular mobile station. Like a record in a database, a page record is comprised of many fields that contain important information for the mobile station. For example, some fields define the page type, while others include the page message or other instructions for the mobile station. One field in particular is the terminal identifier field. This is the field that a mobile station searches when determining which page record in a GPM is intended for that mobile station. Every mobile station in the RAN's global coverage area is associated with a globally unique terminal ID. When the RAN has a page message to send to a particular mobile station, the RAN creates a page record containing the page message, and encodes the globally unique terminal ID as a bit string into the terminal identifier field. To receive a page message, the mobile station (i) wakes up during its time slot, (ii) receives the GPM, and (iii) searches the GPM for a page record with a terminal identifier field that matches the mobile station's terminal ID.

OVERVIEW

With the advent of text messages and data services being provided to more and more users, many more pages are being sent to mobile stations than ever before. Unfortunately, GPMs are size restricted and thus have an upper limit on the number of page records that can be included in any one GPM. When this upper limit of page records is reached, further text messages and voice calls will be delayed or denied by the RAN, resulting in a decreased quality of service for the user. The number of page records that can fit in any one GPM is dependent upon the size of the individual page record. Therefore, if the size of the page record could be reduced, more page records could fit into a GPM, resulting in increased quality of service for users.

One way to reduce the size of the overall page record is to reduce the size of one or more page record fields. The terminal ID field is typically the largest of all the page record fields, and so it is a prime candidate for size reduction. For example, in some protocols, the total size of the page record is about 60 bits. The globally unique terminal ID may be as long as 10 digits, requiring up to 34 bits to encode as a string into the terminal ID field. This accounts for over half of the page record's overall size. It would be advantageous to use a shorter terminal ID so that fewer bits are required to encode the terminal ID, and thus the size of the page record can be reduced.

Disclosed herein is a method to help reduce terminal ID length for purposes of paging, and thereby to decrease page record size and thus increase the number or page records that can be transmitted in any particular GPM. In current practice, a terminal ID is globally unique, meaning that no two mobile stations in the entire network have identical terminal IDs. However, if a terminal ID was only locally unique, then the length of such a terminal ID could accordingly be shortened. In one embodiment according to the present method, the RAN assigns a temporary locally unique terminal ID to a mobile station each time that mobile station enters a new paging area. The terminal ID only needs to be unique for each mobile station in the same paging area. And since the number of mobile stations that are registered in any one paging area is clearly smaller than the number of mobile stations registered in the global network, the number of mobile stations that must have a unique terminal ID is smaller. This allows for a shortened terminal ID.

In another embodiment according to the present method, the RAN assigns a terminal ID that is only unique for mobile stations that share a paging channel time slot in the paging area. Since the number of mobile stations that share a paging channel time slot is smaller than the number of mobile stations in the entire paging area, the number of mobile stations that must have a unique ID is smaller. This allows for a further shortened terminal ID.

These as well as other aspects and advantages will become apparent to those of ordinary skill in the art by reading the following detailed description, with reference where appropriate to the accompanying drawings. Further, it should be understood that the embodiments described in this summary and elsewhere are intended to be examples only and do not necessarily limit the scope of the invention.

BRIEF DESCRIPTION OF THE DRAWINGS

FIG. 4 illustrates an example GPM.

DETAILED DESCRIPTION

Figure 1:
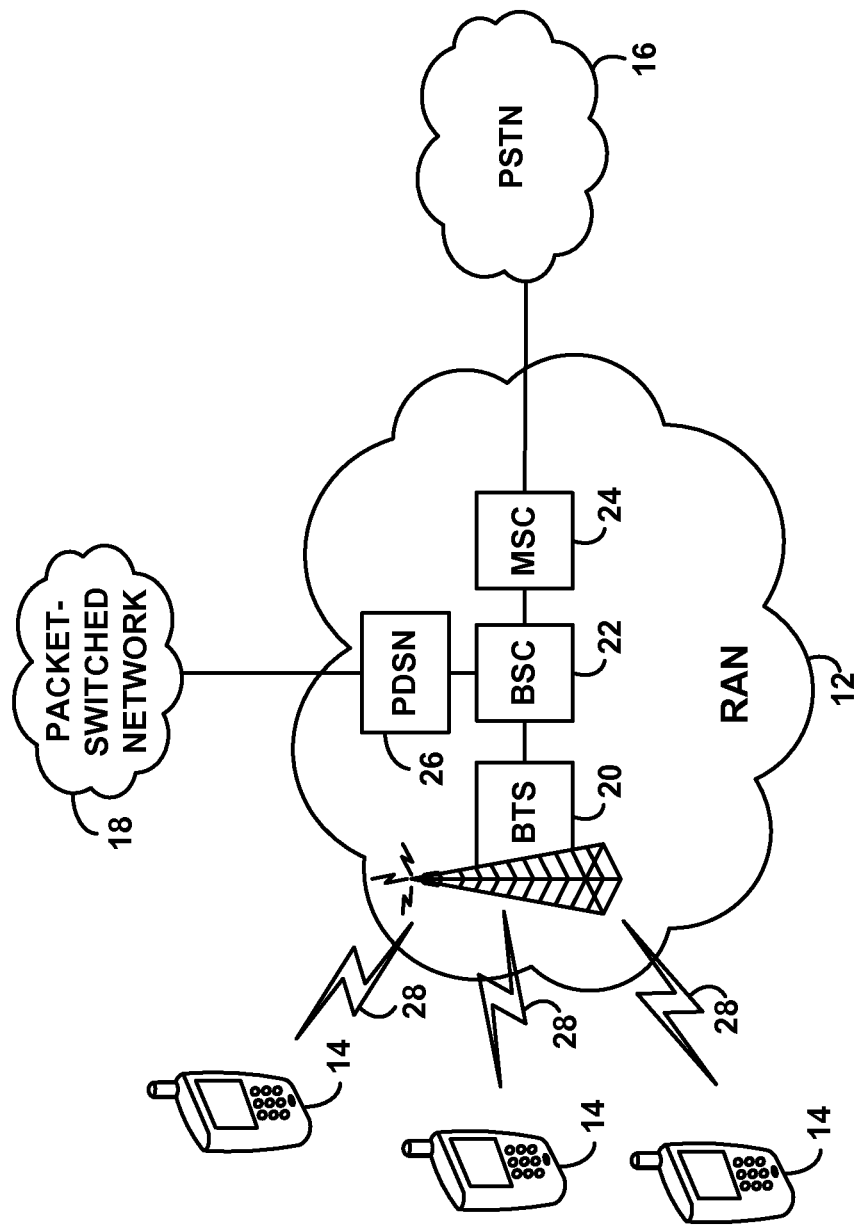
FIG. 1 is a simplified block diagram of a cellular wireless communication network in which an exemplary embodiment of the method can be implemented.

Referring to the drawings, FIG. 1 is a simplified block diagram of a cellular wireless communication network 10 arranged to carry out an exemplary embodiment of the present method. As shown, the network 10 includes at its core a radio access network (RAN) 12, which may function to provide connectivity between one or more mobile stations 14 (e.g., a cell phone, PDA, or other wirelessly-equipped device), and one or more transport networks, such as a public switched telephone network (PSTN) 16 or a packet-switched network (e.g., the Internet) 18. The RAN 12 may comprise, among other entities, a base transceiver station (BTS) 20, a base station controller (BSC) 22, a mobile switching center (MSC) 24, and a packet data serving node (PDSN) 26.

It should be understood, however, that this and other arrangements described herein are set forth for purposes of example only. As such, those skilled in the art will appreciate that other arrangements and other elements (e.g., machines, interfaces, functions, orders of functions, etc.) can be used instead, some elements may be added, and some elements may be omitted altogether. Further, as in most telecommunications applications, those skilled in the art will appreciate that many of the elements described herein are functional entities that may be implemented as discrete or distributed components or in conjunction with other components, and in any suitable combination and location. Still further, various functions described herein as being performed by one or more entities may be carried out by hardware, firmware and/or software logic. For instance, various functions may be carried out by a processor executing a set of machine language instructions stored in memory. Provided with the present disclosure, those skilled in the art can readily prepare appropriate computer instructions to perform such functions.

As shown in FIG. 1, the BTS 20 may function to transmit one or more radio frequency (RF) radiation patterns, each of which may define a given wireless coverage area such as a cell or cell sector. Within each given wireless coverage area, the BTS's RF radiation pattern provides an air interface 28 through which the mobile stations 14 may communicate with the BTS 20 of the RAN 12. The BTS 20 typically couples to the BSC 22, which may function to communicate with the BTS 20 and control aspects of the BTS 20 as well as aspects of the wireless communication over the air interface 28. In turn, the BSC 22 typically couples to the MSC 24, which may provide connectivity with the PSTN 16, and the BSC 22 also typically couples to the PDSN 26, which may provide connectivity with the packet-switched network 18. The PSTN 16 may be a circuit-switched network that establishes a dedicated communication path for use during a communication session, whereas the packet-switched network 18 communicates data in the form of packets, with no previously-established communication path. The connections between the entities of the RAN 12, other than the air interface 28, may include physical cables, such as T1 trunk lines or E1 trunk lines, and/or wireless links, such as microwave links or satellite channels.

The air interface 28 may carry communications between the BTS 20 and mobile stations 14 according to any of a variety of protocols. For instance, such protocols may include: CDMA (e.g., 1xRTT, 1xEV-DO), iDEN, TDMA, AMPA, GSM, GPRS, UMTS, EDGE, WiMAX (e.g., IEEE 802.16), LTE, microwave, satellite, MMDS, Wi-Fi (e.g., IEEE 802.11), and Bluetooth or others now known or later developed.

The air interface 28 is typically divided into a plurality of channels for carrying communications between the mobile stations 14 and the BTS 20. For example, the air interface 28 may include a plurality of forward-link channels for carrying communications from the BTS 20 to the mobile stations 14, such as pilot channels, sync channels, paging channels, and forward-traffic channels. Additionally, the air interface 28 may include a plurality of reverse-link channels for carrying communications from the mobile stations 14 to the BTS 20, such as access channels and reverse-traffic channels. The channels of the air interface 28 may be distinguished from each other in various ways. For example, and without limitation, the channel may be distinguished by digital modulation codes known as "Walsh codes".

The paging channel of the air interface 28 primarily functions to carry paging messages to mobile stations 14 in dormant mode, set up communications with mobile stations 14, and deliver small messages to mobile stations 14. The paging channel of the air interface 28 may be divided into time slots of a specific duration (e.g., 80 ms), and a specific number of consecutive time slots (e.g., 32 or 64) may then be grouped into cycles. These time slots function such that a mobile station 14 in dormant mode need only monitor the paging channel at one specific time slot during each cycle (e.g., the $2^{nd}$ time slot in each 32-slot cycle) to determine whether the RAN 12 is attempting to page the mobile station 14, thus reducing power consumption. In certain implementations, a mobile station 14 determines which time slot to monitor based on a hash function of its International Mobile Station Identifier (IMSI). The RAN 12, in turn, may only send slotted messages (e.g., General Paging Messages (GPMs)) to a mobile station 14 in dormant mode (i.e. slotted mode) once per cycle, and only during the mobile station's specific time slot within each cycle. On the other hand, the RAN 12 may send non-slotted messages (e.g., acknowledgement messages (ACKs), channel assignment messages (CAMs), and data burst message (DBMs)) to a mobile station 14 that has exited dormant mode (i.e. is now in the non-slotted mode) during any available time slot of the paging channel.

In practice, the mobile station 14 might only be paged a few times per hour, and so waking up every few seconds is unnecessary. To further reduce the mobile station's waking time, and thus its power consumption, air interface 28 may further include a "quick paging channel" in which quick page messages are sent to mobile station 14. The purpose of the quick paging channel and the quick page message is to indicate to mobile station 14 whether or not the mobile station should wake up for the next paging channel slot. For example, if the RAN 12 knows that mobile station 14 is going to be paged during the next paging channel slot, then the RAN may indicate to mobile station 14 to wake up during the next time slot in order to receive the page message. Otherwise, mobile station 14 would stay asleep during the next time slot in order to conserve battery power.

Figure 2:
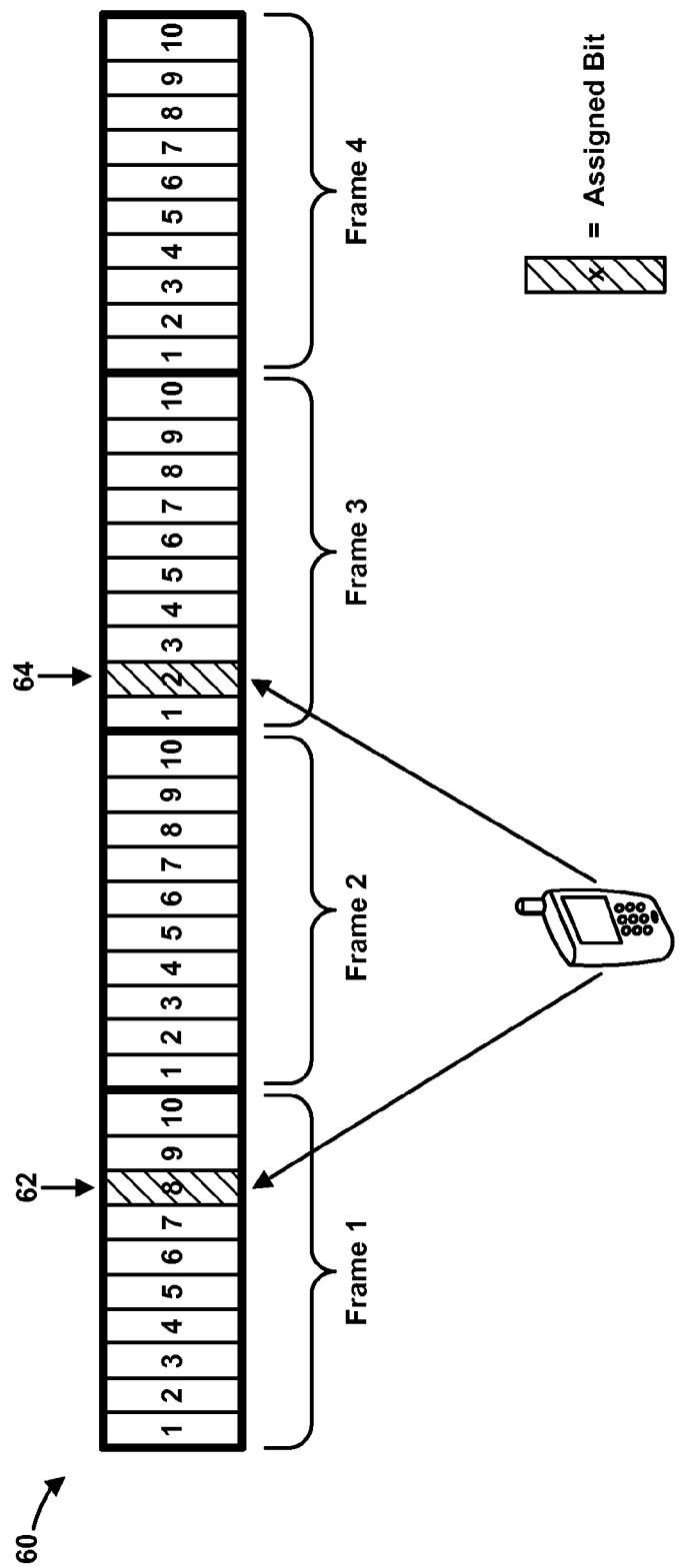
FIG. 2 illustrates an example quick page message.

The quick paging channel is divided into time slots, similar to that of the paging channel, and the RAN 12 assigns each mobile station to a quick paging channel time slot that occurs a short time before that mobile station's time slot (e.g., 100 ms before). In this manner, mobile station 14 can receive the quick page message early enough to determine whether or not to wake up for the next paging channel time slot. FIG. 2 illustrates one implementation of a quick page message 60 sent to mobile station 14 during a quick paging channel time slot. The message 60 includes a plurality of bits (called paging indicator bits), divided into four frames. The RAN 12 assigns each mobile station 14 to check the binary state of two of the plurality of bits. A mobile station's first indicator bit 62 will appear in one of the first or second frames, while the mobile station's second indicator bit 64 will appear in one of the third or fourth frames. Note that in FIG. 2, the frames are shown having 10 bits in each frame, however in practice, more or less bits may be used. In order to indicate to mobile station 14 that it should wake up to receive a page message on the next paging channel slot, the RAN will set both indicator bits 62, 64 in the quick page message 60 sent to mobile station 14. A set bit may take on the value of a "one" as opposed to a "zero", for example. When mobile station 14 receives the quick page message 60, and determines that both of the assigned indicator bits 62, 64 are set, mobile station 14 will wake up during the next paging channel slot. Otherwise, if mobile station 14 determines that one or both indicator bits are not set, then mobile station 14 will not be paged and so it can remain asleep during the next paging channel slot.

The quick paging operation uses a hashing function to assign the mobile stations to two indicator bits in a quick page message. One example of a hashing function that may be used is a Bloom filter. Bloom filters have the possibility of false positives, but not false negatives. Thus, a mobile station may determine that both of that mobile station's assigned bits are set when the mobile station is not actually being paged. However, if a mobile station determines that not both of the mobile station's bits are set, then the mobile station can confidentially conclude that it will not be paged. Due to the false positive nature of the hash function, such quick paging cannot replace paging.

The RAN 12 broadcasts quick page messages once per quick paging channel time slot. Every mobile station assigned to the same quick paging channel time slot then reads the same broadcast quick page message. Depending on how many mobile stations are assigned to the same quick paging channel slot, two or more mobile stations may need to share a first indicator bit. For example, if there are 40 indicator bits sent during the first two frames of a particular quick paging channel slot, and 400 mobile stations assigned to that particular quick paging channel slot, it is clear that the 400 mobile stations will have to be divided among the 40 first indicator bits. In this case, each first indicator bit will have 10 mobile stations assigned to it (assuming an even distribution).

The quick page message is much smaller compared with a general page message. In some implementations, the quick page message is about half of the length of a general page message. So when reading a quick page message as compared to a general page message, mobile station 14 is awake for about half of the time. Thus, compared to a network that operates without a quick paging channel, quick paging increases the wakeup duration of paged mobile stations by about 50%, since paged mobile stations will wake for the quick paging channel slot and the paging channel slot. However, quick paging decreases the wake up duration of unpaged mobile stations by also about 50%, since unpaged mobile stations wake up for only the quick paging slot and remain asleep during the paging channel slot. Typically only a very small percentage of mobile stations are paged. This translates to a 50% increase in waking duration for only a very small percentage of mobile stations. For the rest of the mobile stations, this translates to a 50% decrease in waking duration. Overall, the wakeup duration of the mobile stations is thus reduced.

Figure 3:
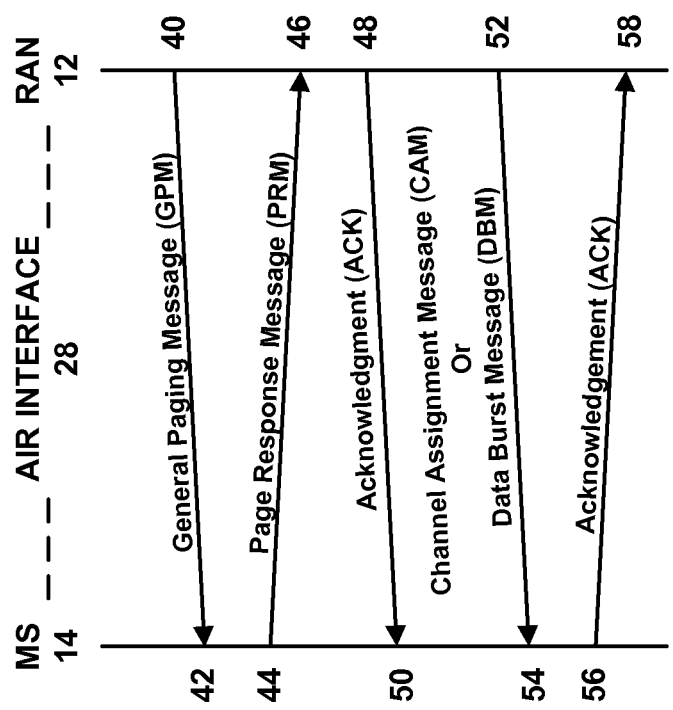
FIG. 3 illustrates an exemplary paging message flow diagram for setting up a call with a mobile station in dormant mode via a radio access network.

After mobile station 14 determines that it should wake up during the next paging channel time slot, mobile station 14 listens for a general page message on the paging channel time slot. FIG. 3 illustrates an exemplary paging message flow diagram for setting up a call with a mobile station 14 in dormant mode via the RAN 12. (As used in this specification, the term "call" may be used interchangeably with the term "communication" and is not limited to a voice call). The call setup in FIG. 3 is conducted over a paging channel and an access channel for instance.

The RAN 12 may initiate the call setup with the mobile station 14 after receiving a request from an endpoint to set up a call of a particular type (e.g., voice, data, Short Message Service (SMS)) with the mobile station 14. At step 40, after receiving the request, the RAN 12 may first generate a GPM containing a page record intended for the mobile station 14. If the RAN 12 has also received page requests for other mobile stations that share the same time slot as mobile station 14, the GPM may also contain page records intended for those other mobile stations. Once the RAN 12 generates the GPM for the mobile station's time slot, the RAN 12 may broadcast the GPM to one or more wireless coverage areas (via one or more air interfaces) during the mobile station's time slot in one of the paging channel cycles. In turn, at step 42, the mobile station 14, while in dormant mode, may detect the GPM containing its identifier while monitoring its time slot on the paging channel of the air interface 28. In response, at step 44, the mobile station 14 may (i) generate and transmit a Page Response Message (PRM) to the RAN 12 (via the access channel of the air interface 28) indicating the mobile station's availability to receive the call, and (ii) exit dormant mode and begin monitoring the paging channel continuously.

At step 46, the RAN 12 may receive the PRM from the mobile station 14 via the access channel of the air interface 28, and at step 48, the RAN 12 may responsively generate and transmit an ACK to the mobile station 14 during any available time slot of the paging channel, which the mobile station 14 may receive at step 50. Thereafter, at step 52, the RAN 12 may assign the mobile station 14 a traffic channel by generating and transmitting a CAM to the mobile station 14 (via the air interface 28) during any available time slot. Alternatively, if the RAN 12 is setting up an SMS call at step 52, the RAN 12 may send the content of the SMS communication by generating and sending a DBM to the mobile station 14 during any available time slot. Finally, at step 54, the mobile station 14 may receive the CAM or DBM from the RAN 12 via the air interface 28. If the message is the CAM, the mobile station 14 may responsively tune to the assigned traffic channel and begin communicating with the endpoint that initiated the call via the assigned traffic channel of the air interface 28 and the RAN 12. Alternatively, if the message is the DBM, the mobile station 14 may provide the content of the DBM to a user of the mobile station 14. At step 56, the mobile station 14 may then transmit an ACK to the RAN 12 via the air interface 28. In either case, the paging process is typically complete after the RAN 12 receives the ACK.

FIG. 4 illustrates an example of a GPM 80. The example GPM 80 is composed of a header, several paging records, padding, and a cyclic redundancy check (CRC). The page records contribute to the main body of GPM 80, and carry the page information for the individual mobile stations being paged. Each page record is composed of several fields, and of particular importance is the terminal ID field. Mobile stations receiving GPM 80 read terminal identifier fields of the page records in order to determine which page record is intended for which mobile station. In current practice, the terminal identifier is a globally unique number, such as a Mobile Identification Number (MIN), or an International Mobile Station Identifier (IMSI). Common practice is to use a number deriving from a mobile station's IMSI, but still globally unique, such as the 10 digit IMSI_S 81, shown in GPM 80.

As noted above, it would be advantageous to reduce the size of the terminal ID so that fewer bits are required for each page record, and thus more page records can fit in any given GPM. One reason why the IMSI_S is so long is that it is globally unique. This allows page records to uniquely identify and differentiate between mobiles stations within the entire global network. But page records in a GPM do not need to differentiate between every mobile station in the global network because they are not sent to every mobile station in the global network. GPMs are sent according to time slots and therefore they only need to differentiate between mobile stations that share the same time slot (i.e., mobile stations that receive the same GPM).

Accordingly, one method of reducing the length of the terminal ID is to replace the globally unique ID with a locally unique ID. The locally unique ID would only need to be unique for mobile stations that share a paging channel time slot in a given paging area. Terminal IDs for mobile stations assigned to different paging channel time slots in a given paging area need not be unique. In fact, the terminal IDs of two mobile stations in different time slots of the same paging area may be identical. This is acceptable due to the slotted nature of the paging channel. Since two mobile stations with different paging channel time slots receive different GPMs, page records within the GPMs can use the same identifier to identify the two different mobile stations. The number of mobile stations that share a paging channel time slot in a given paging area is clearly smaller than the number of mobile stations registered in the entire network. Therefore, the length of an identifier that is made unique only for mobile stations that share a paging channel time slot can be shorter than a globally unique identifier. This shorter terminal ID can be used in place of the IMSI_S in page records, to reduce the size of the individual page record.

In accordance with an embodiment of the present method, RAN 12 may maintain a pool of unique identifiers for each paging channel time slot in a given paging area. When mobile station 14 registers with the RAN 12 in a given paging area, the RAN 12 may assign mobile station 14 to a paging channel time slot and communicate that slot assignment to the mobile station 14. At the time that RAN 12 assigns mobile station 14 to a paging channel time slot, RAN 12 may also retrieve an unassigned local ID from the pool and assign it to mobile station 14. RAN 12 may indicate this assigned local ID to mobile station 14 in the same communication that indicates the assigned paging channel time slot. Alternatively, the RAN 12 may indicate the assigned local ID to mobile station 14 in a separate message, or in some other manner. When mobile station 14 exits the paging area, the RAN 12 may reclaim the local ID back into the pool.

To determine what length of the local IDs to use, the RAN 12 may estimate the maximum number of mobile stations that would be assigned to a given time slot at any time. For example, if the RAN 12 estimates the maximum number of mobile stations that would be assigned to any given time slot in a certain paging area to be 64, then local IDs can have a length as small as six bits. However, if that estimate turns out to be insufficient, the RAN 12 may increase the length of the IDs, and broadcast the new length to all mobile stations in the paging area in a configuration message.

It is contemplated that the locally unique terminal ID could still be further shortened if the terminal ID did not have to be unique for each mobile station assigned to a given paging channel time slot, and could instead be unique for, say, only a subgroup of the mobile stations assigned to the paging channel time slot. If the subgroup is a proper subgroup (i.e., the number of mobile stations in the subgroup is smaller than the number assigned to the entire time slot) then the terminal ID could be further shortened. A problem quickly arises in this case, however, in that there could be two mobile stations in different subgroups (but the same overall paging channel slot group) that are assigned identical terminal IDs. If only one GPM is sent during each time slot, and if the two mobile stations are being paged simultaneously, they would not be able to determine which page record in the GPM is meant for which mobile station.

To solve this problem, a further method is provided that allows the terminal IDs to be unique for only mobile stations that share a subgroup of the quick paging channel while still allowing for the mobile stations to correctly identify which page record to read in the GPM. According to this further method, when mobile station 14 registers with the RAN 12 in a given paging area, the RAN 12 assigns mobile station 14 to a paging channel time slot and communicates that slot assignment to mobile station 14. At this time, the RAN 12 may also assign mobile station 14 to a subgroup within the paging channel time slot. The RAN 12 may assign mobile station 14 to a subgroup that is already created and has other mobile stations assigned to it, or it may create a new subgroup to assign mobile station 14. It is contemplated that there could be as many subgroups within the paging channel time slot as the RAN 12 deems appropriate. RAN 12 may assign mobile stations to subgroups arbitrarily, or according to some determined characteristic. For example, it may be advantageous to group together mobile stations that are frequently paged at similar times, due to the fact that page records intended for those mobile stations would often appear in the same GPM. It would then be necessary to differentiate between those mobile stations with unique terminal IDs.

RAN 12 may maintain a pool of unique terminal IDs for each subgroup. After RAN 12 assigns mobile station 14 to a subgroup, RAN 12 will retrieve an unassigned terminal ID from the pool and assign it to mobile station 14. Similar to the method described above, the RAN 12 may indicate this assigned local ID to mobile station 14 in the same communication that indicates the assigned paging channel time slot. Alternatively, the RAN 12 may indicate the assigned local ID to mobile station 14 in a separate message, or in some other manner. When mobile station 14 exits the paging area, the RAN 12 may reclaim the local ID back into the pool.

When composing the GPM, the RAN 12 will group together page records for mobile stations that share a subgroup. After a mobile station receives the GPM, it should only search within the appropriate group of page records for a terminal ID that matches the mobile station's assigned terminal ID. If the mobile station finds a match, then the mobile station continues the call setup process by sending RAN 12 a PRM. If the mobile station does not find a match within the appropriate group, then the mobile station is not paged and returns to dormant mode.

Figure 5:
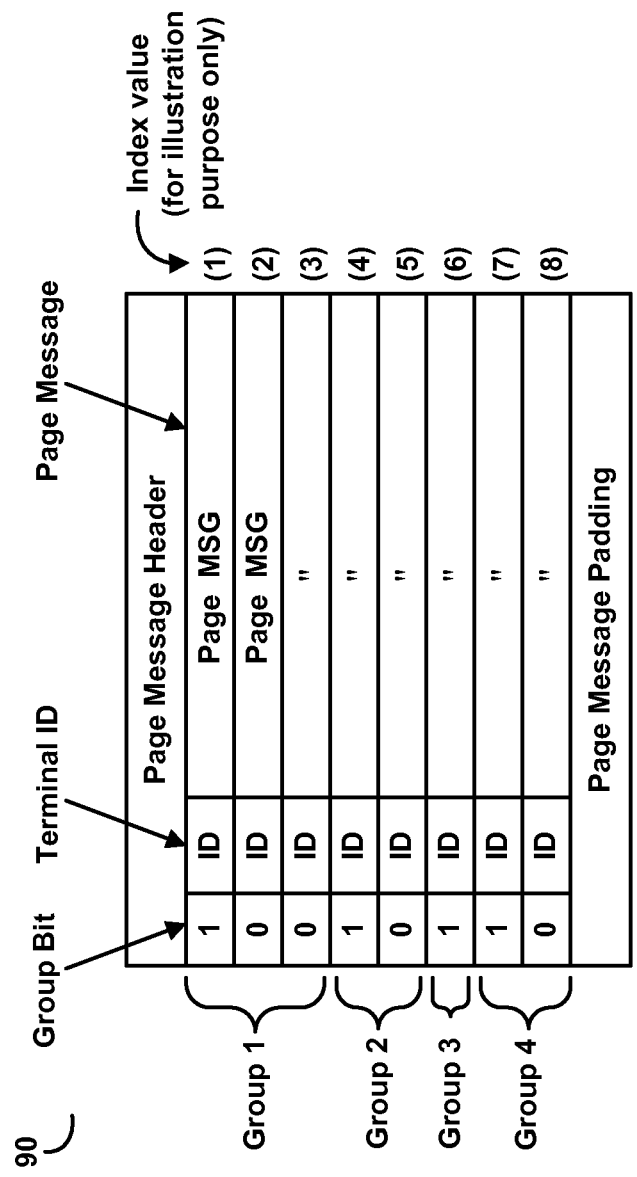
FIG. 5 illustrates an exemplary GPM with page records set out in groups.

Since page records appear one after the other in a GPM, the RAN 12 should identify or indicate to receiving mobile stations the boundaries of each group of page records. One method is to mark each page record that begins a new group with a specific identifier. Mobile stations that receive the GPM can determine which page records comprise a group by detecting the identifiers. FIG. 5 illustrates an example GPM 90 with page records set out in four groups. The indicator is embodied as a group bit that precedes the terminal ID. A set group bit (i.e., a group bit that has a "one" value) indicates that the page record is the start of a new group of page records. An unset group bit (i.e., a group bit that has a "zero" value) indicates that the page record is not the start of a new group, and is thus part of the present group. A receiving mobile station can determine which page records comprise any given group by simply determining which page records have a set group bit. Although not shown, it should be noted that the page records that start a new group could just as easily be marked with an unset group bit instead of a set group bit. Page records that do not begin a new group would accordingly be marked with a set group bit.

In order for mobile stations to determine which group of page records in a GPM to search for a terminal ID in, RAN 12 should indicate to the mobile stations which group to search in. This indication could take the form of a control message broadcast to all mobile stations prior to sending the GPM. For example, say a message to mobile station 14 indicated that in the next GPM, mobile station 14 should search the page records in group 4 to determine if it is being paged. Mobile station 14 would then search for the fourth page record with a group bit set to "one", and proceed to search within that group.

Figure 6:
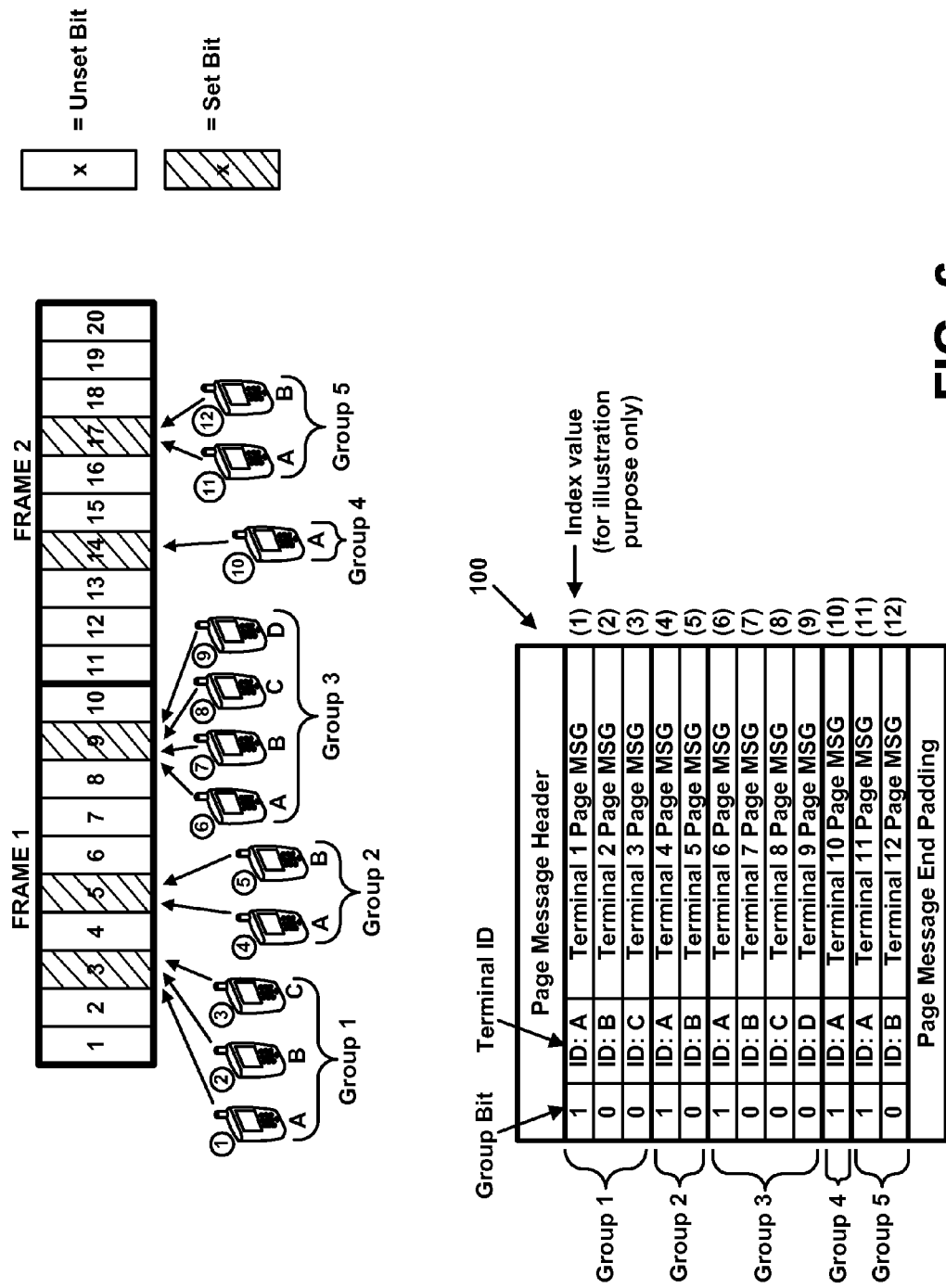
FIG. 6 illustrates an exemplary scheme for forming subgroups based on quick page message structure.

As an alternative to sending to each mobile station a separate message with an indication of which group to search in the next GPM, RAN 12 could code the indication within any message sent to mobile stations. For example, the indication of which group to search in could be coded within a quick page message. FIG. 6 illustrates an example of how such a coding could take place. The first two frames of a quick page message are shown. In this particular example, first indicator bits 3, 5, and 9 are set in the first frame, and first indicator bits 14 and 17 are set in the second frame. Again, this quick page message is shown having 10 bits in each frame, but in practice, a quick page message may have more or less. Mobile stations 1-12 are shown and assigned to one of the set first indicator bits. Additional mobile stations may be assigned to the other first indicator bits, however those mobile stations are not shown for brevity's sake. The groups of mobile stations that form based on assigned first indicator bits can be the basis for which RAN 12 creates the subgroups. Mobile stations assigned to the same first indicator bit, would be assigned to the same subgroup. And terminal IDs would be unique for only mobile stations that share a first indicator bit. This is shown, as IDs "A", "B", and "C" are assigned to mobile stations 1, 2, and 3 respectively. IDs "A" and "B" are reused in the next subgroup, i.e., with mobile stations 4 and 5. This does not create a conflict because mobile stations search only within their assigned group in the GPM, and terminal IDs are unique within the group.

In order to determine which group to search in, a mobile station first determines in which frame that mobile station's first indicator bit is assigned. If frame 1, then the mobile station determines how many first indicator bits are set before the mobile station's own first indicator bit is set. For example, mobile station 7 is assigned a terminal ID "B", and a first indicator bit in position 9. In this particular quick page message, mobile station 7 determines that first indicator bit 9 is set and also determines that two other first indicator bits are set before bit 9 (i.e., bits 3 and 5, in this example). In GPM 100, mobile station 7 will search the third group from the top of the GPM for a page record with ID "B" to determine if it is being paged. To find the third group from the top, mobile station 7 first determines the third page record from the top of the GPM that has a group bit set to "one". In GPM 100, this is page record index value 6. Mobile station 7 then reads the terminal ID fields of each page record, including page record index value 6, until it finds one with either ID "B", or a group bit set to "one". If mobile station 7 finds the next record with a set group bit before it finds a record with ID "B", mobile station 7 is not paged. In this example, mobile station 7 finds ID "B" at page record index value 7.

If a mobile station is assigned a first indicator bit in the second frame, then that mobile station would need to determine how many first indicator bits are set after the mobile station's own first indicator bit is set. For a mobile station assigned to a first indicator bit in the second frame, it would be unnecessary for that mobile station to read any part of the first frame of the quick page message. Thus, that mobile station would not know how many first indicator bits are set in the first frame. Without knowing the precise number of first indicator bits set in the first frame, the mobile station cannot determine how many groups from the top of the GPM the mobile station's own group is in. However, the mobile station does know how many first indicator bits are set after its own is set, and so the mobile station can determine how many groups from the bottom of the GPM the mobile station's own group is in. For example, mobile station 10 is assigned a terminal ID "A", and a first indicator bit in position 14. In this particular quick page message, mobile station 10 determines that first indicator bit 14 is set and also determines that one other first indicator bit is set after bit 14 (i.e., bit 17, in this example). In GPM 100, mobile station 10 will search the second group from the bottom of the GPM for a page record with ID "A" to determine if it is being paged. To find the second group from the bottom, mobile station 10 first determines the second page record from the bottom of the GPM that has a group bit set to "one". In GPM 100, this is page record index value 10. Mobile station 10 then reads the terminal ID fields of each page record, including page record index value 10, until it finds one with either ID "A", or a group bit set to "one". If mobile station 10 finds the next record with a set group bit before it finds a record with ID "A", mobile station 10 is not paged. In this example, mobile station 10 finds ID "A" at page record index value 10.

Coding of the indication of which group of page records in the GPM to search in has been described with reference to the quick page message. However, one skilled in the art would recognize from this disclosure that such a coding could take place in any message the RAN sends to mobile stations, and should not be limited to just the quick page message.

Exemplary embodiments of the present invention have been described above. Those skilled in the art will understand, however, that changes and modifications may be made to the embodiments described without departing from the true scope and spirit of the present invention, which is defined by the claims.

We claim:

1. In a wireless communication system in which a radio access network (RAN) transmits page messages in paging channel time slots, wherein the RAN serves a plurality of wireless access terminals, each access terminal of the plurality having a globally unique identifier, wherein each access terminal of a first proper subset of the plurality of access terminals is arranged to monitor a first paging channel time slot for page messages and each access terminal of a second proper subset of the plurality of access terminals is arranged to monitor a second paging channel time slot for page messages, a paging method comprising:

assigning a respective first temporary identifier to each access terminal of the first proper subset, wherein the respective first temporary identifier has a shorter length than the globally unique identifier, and wherein the respective first temporary identifier is locally unique among the access terminals of the first proper subset;

assigning a respective second temporary identifier to each access terminal of the second proper subset, wherein the respective second temporary identifier has a shorter length than the globally unique identifier, and wherein the respective second temporary identifier is locally unique among the access terminals of the second proper subset, and wherein one of the respective first temporary identifiers is identical to one of the respective second temporary identifiers; and transmitting during the first paging channel time slot a first page message carrying data specifying a respective first temporary identifier, so that a first access terminal detects the data specifying the respective first temporary identifier in the first page message and determines based on the data that the first page message is intended for the first access terminal.

2. The method of claim 1, further comprising:

transmitting during the second paging channel time slot a second page message carrying data specifying a respective second temporary identifier, so that a second access terminal detects the data specifying the respective second temporary identifier in the second page message and determines based on the data that the second page message is intended for the second access terminal, wherein the respective second temporary identifier specified by the data in second page message is identical to the respective first temporary identifier specified by the data in the first page message.

3. The method of claim 1, wherein an additional particular access terminal of the plurality of access terminals is arranged to monitor the first paging channel time slot for page messages, the method further comprising:

assigning a respective third temporary identifier to the particular access terminal, wherein the respective third temporary identifier has a shorter length than the globally unique identifier, and wherein the third temporary identifier is identical to one of the respective first temporary identifiers.

4. The method of claim 3, wherein the additional particular access terminal is one of a third proper subset of the plurality of access terminals, wherein each access terminal of the third proper subset is arranged to monitor the first paging channel time slot, the method further comprising:

assigning a respective third temporary identifier to each access terminal of the third proper subset, wherein the respective third temporary identifier has a shorter length than the globally unique identifier, and wherein the respective third temporary identifier is locally unique among the access terminals of the third proper subset.

5. The method of claim 4, further comprising:

assigning each access terminal of the plurality of access terminals to an indicator bit of a quick paging channel; and arranging each access terminal of the first proper subset and each access terminal of the third proper subset into their respective subsets based on each access terminal's assigned indicator bit on the quick paging channel, each access terminal of the first proper subset being assigned to the same indicator bit, each access terminal of the third proper subset being assigned to the same indicator bit, and the access terminals of the first proper subset being assigned to a different indicator bit than the access terminals of the third proper subset.

6. The method of claim 3, further comprising:

transmitting during the first paging channel time slot a second page message carrying data specifying the respective third temporary identifier, so that the additional particular access terminal detects the data specifying the respective third temporary identifier in the second page message and determines based on the data that the second page message is intended for additional particular access terminal, wherein the respective third temporary identifier specified by the data in second page message is identical to the respective first temporary identifier specified by the data in the first page message.

7. The method of claim 6, further comprising compiling the first and second page messages into a general page message; and wherein transmitting the first page message and transmitting the second page message comprises broadcasting the general page message during the first paging channel time slot to each access terminal of the plurality of access terminals that are arranged to monitor the first paging channel time slot.

8. The method of claim 1, wherein assigning a respective first temporary identifier to each access terminal of the first proper subset includes:

in response to receiving from a particular access terminal of the first proper subset of access terminals a request for registration in a given paging area, (i) assigning a particular respective first temporary identifier to the particular access terminal, wherein the particular respective first temporary identifier has a shorter length than the globally unique identifier, and wherein the particular respective first temporary identifier is locally unique among the access terminals of the first proper subset, and (ii) transmitting to the particular access terminal data that specifies the particular respective first temporary identifier.

\* \* \* \* \*